United States Patent
Jarry et al.

(10) Patent No.: US 11,149,366 B2
(45) Date of Patent: Oct. 19, 2021

(54) METHOD AND FACILITY FOR MANUFACTURING CROSS-LINKED FIBERGLASS MATERIAL

(71) Applicant: L'Air Liquide, Societe Anonyme pour l'Etude et l'Exploitation des Procedes Georges Claude, Paris (FR)

(72) Inventors: Luc Jarry, Beaufai (FR); Youssef Joumani, Crespieres (FR); Gregoire Beasse, Paris (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 301 days.

(21) Appl. No.: 15/748,932

(22) PCT Filed: Jul. 28, 2016

(86) PCT No.: PCT/FR2016/051961
§ 371 (c)(1),
(2) Date: Jan. 30, 2018

(87) PCT Pub. No.: WO2017/017383
PCT Pub. Date: Feb. 2, 2017

(65) Prior Publication Data
US 2019/0003092 A1    Jan. 3, 2019

(30) Foreign Application Priority Data
Jul. 30, 2015  (FR) ...................................... 1557346

(51) Int. Cl.
*D04H 3/004* (2012.01)
*C03B 37/04* (2006.01)
(Continued)

(52) U.S. Cl.
CPC ............. *D04H 3/004* (2013.01); *C03B 5/237* (2013.01); *C03B 5/2353* (2013.01); *C03B 37/04* (2013.01);
(Continued)

(58) Field of Classification Search
CPC ....... C03B 37/06; C03B 5/237; C03B 5/2353; Y02P 40/55; Y02P 40/535; D04H 3/004; D04H 3/12; D10B 2101/06
See application file for complete search history.

(56) References Cited

U.S. PATENT DOCUMENTS 2,633,428 A    3/1953 Klug
2,665,125 A    1/1954 Klug
(Continued)

FOREIGN PATENT DOCUMENTS

DE    10 2013 110283    3/2015
DE    102013110283 A1 *  3/2015    ........... C03B 5/2353
(Continued)

OTHER PUBLICATIONS

International Search Report and Written Opinion for PCT/FR2016/051960, dated Oct. 27, 2016.
(Continued)

*Primary Examiner* — Vishal I Patel
(74) *Attorney, Agent, or Firm* — Christopher J. Cronin

(57) ABSTRACT

The invention relates to a method and facility for manufacturing a cross-linked fiberglass material, in which melted glass is produced in a melting furnace heated via combustion of a fuel with an oxygen-rich oxidant. The melted glass is converted into glass filaments, the filaments are bonded, a sheet is made from the bonded filaments, and the sheet is then cross-linked. The fumes from the melting furnace are used to preheat a combustion reagent in two steps: a first step in which air is heated via heat exchange with the fumes, and
(Continued)

a second step in which the combustion reagent is preheated via heat exchange with the hot air. The air is then used in the cross-linking step of the method for converting the melted glass into a fiberglass material.

8 Claims, 1 Drawing Sheet

(51) Int. Cl.
  *C03B 37/06* (2006.01)
  *C03B 5/235* (2006.01)
  *C03B 5/237* (2006.01)
  *D04H 3/12* (2006.01)
(52) U.S. Cl.
  CPC ............... *C03B 37/06* (2013.01); *D04H 3/12* (2013.01); *D10B 2101/06* (2013.01); *Y02P 40/50* (2015.11)

(56) References Cited

U.S. PATENT DOCUMENTS

| | | | |
|---|---|---|---|
| 2,845,364 A | 7/1958 | Waggoner | |
| 2,970,934 A | 2/1961 | May | |
| 3,012,845 A | 12/1961 | Lotz | |
| 2007/0137259 A1* | 6/2007 | Borders | C03B 37/065 65/454 |
| 2010/0162772 A1* | 7/2010 | McGinnis | C03B 5/2353 65/474 |
| 2011/0111198 A1* | 5/2011 | Letourmy | D04H 1/4218 428/220 |

FOREIGN PATENT DOCUMENTS

| | | | |
|---|---|---|---|
| EP | 0 500 923 | 9/1992 | |
| EP | 1 338 848 | 8/2003 | |
| EP | 1338848 A2 * | 8/2003 | .............. F23L 7/007 |
| EP | 2 551 243 | 1/2013 | |
| FR | 3015636 A1 * | 1/2013 | ............. C03B 5/237 |
| FR | 3 000 174 | 6/2014 | |
| FR | 3 000 175 | 6/2014 | |
| FR | 3000175 A1 * | 6/2014 | ........... F25J 3/04133 |
| FR | 3 015 469 | 6/2015 | |
| FR | 3 015 635 | 6/2015 | |
| FR | 3 015 636 | 6/2015 | |
| FR | 3 015 637 | 6/2015 | |
| FR | 3015469 A1 * | 6/2015 | ............... C03B 7/06 |
| FR | 3015636 A1 * | 6/2015 | ............ F23L 15/045 |
| FR | 3015637 A1 * | 6/2015 | ............ F23L 15/045 |
| WO | WO 2013 010722 | 1/2013 | |

OTHER PUBLICATIONS

International Search Report and Written Opinion for PCT/FR2016/051962, dated Oct. 27, 2016.
International Search Report and Written Opinion for PCT/FR2016/051961, dated Feb. 1, 2018.
Shaonan, et al., "New Energy-saving Building Materials," p. 105-111, China Building Materials Industry Press, Dec. 31, 1992.
"Thermal Insulation Materials and Thermal Insulation Engineering Practical Handbook," compiled by China Heat & Sound Insulation Materials Association, pp. 85-86, China Building Materials Press, Jul. 31, 1998.

* cited by examiner

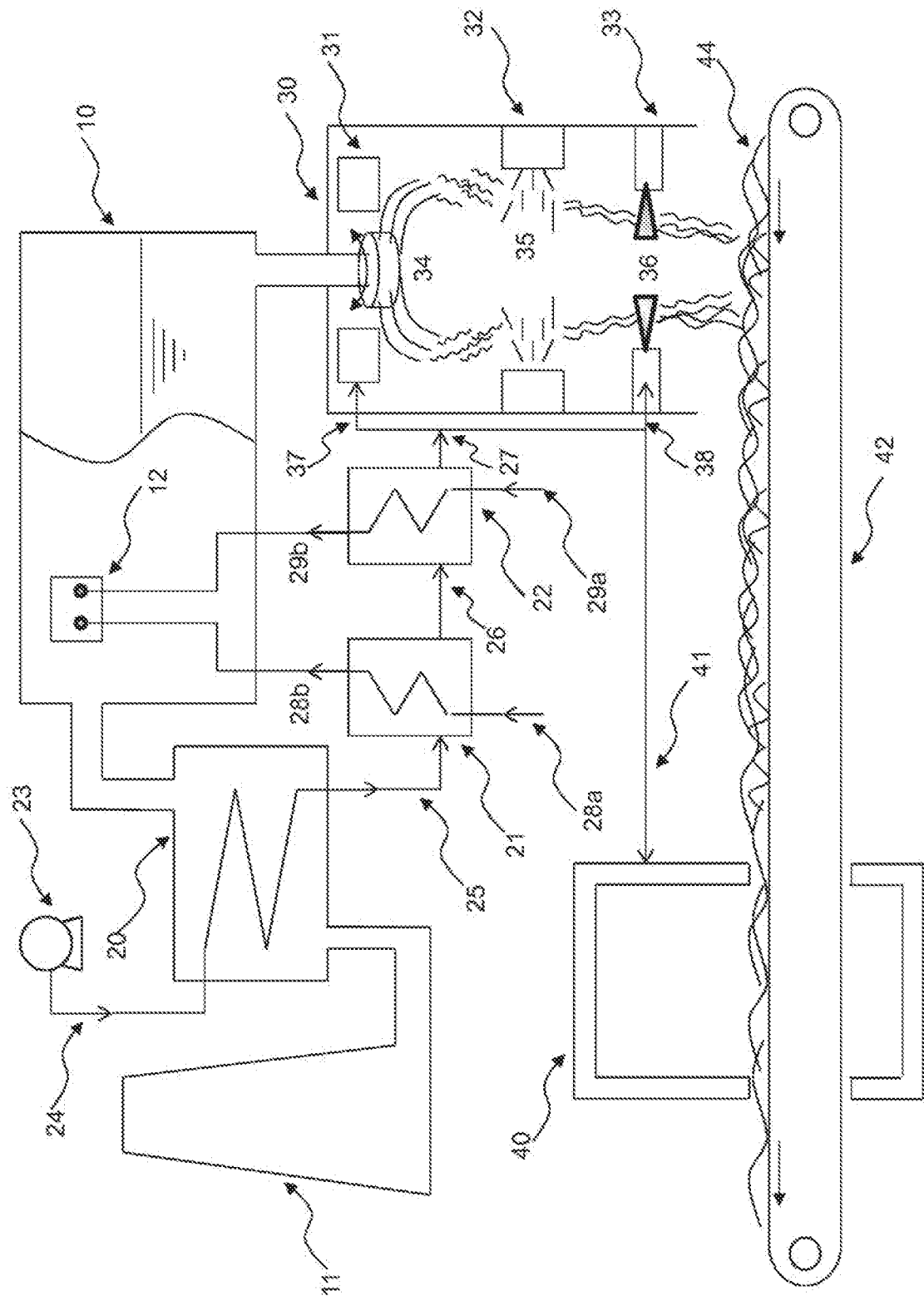

METHOD AND FACILITY FOR MANUFACTURING CROSS-LINKED FIBERGLASS MATERIAL

CROSS-REFERENCE TO RELATED APPLICATIONS

This application is a § 371 of International PCT Application PCT/FR2016/051961, filed Jul. 28, 2016, which claims § 119(a) foreign priority to French patent application FR 1 557 346, filed Jul. 30, 2015.

BACKGROUND

Field of the Invention

The invention relates to the manufacture of glass fiber products.

The term "glass fiber product" is understood to mean glass fibers as such and also products containing them.

Related Art

It is known to manufacture glass fibers by a process comprising the spinning of streams of glass from a melting furnace by means of a bushing, the attenuation of the streams into one or more filaments, the application of adhesive and the collecting of the filaments and the cross-linking of the collected adhesive-treated filaments. This type of process is known in particular for the manufacture of insulation products and in particular of thermal or acoustic insulation products, as well as for the manufacture of fire-protection products. The application of adhesive and the crosslinking can also be involved in the manufacture of nonwoven glass fiber fabrics.

SUMMARY OF THE INVENTION

It is an aim of the present invention to provide such a process for the manufacture of glass fiber products which is optimized as less energy-consuming.

An aim of the present invention is more particularly to provide such an optimized manufacturing process without a negative effect on the quality of the glass fiber products.

According to the present invention, this is produced in particular by better energy integration of the phase of molten glass production and the crosslinking phase.

Another aim of the present invention is to provide a suitable plant for the implementation of such an optimized process.

In the manufacturing process according to the invention, molten glass is converted into a glass fiber product. This conversion comprises the following stages:

spinning the molten glass into at least one stream, attenuating the at least one stream into one or more filaments, collecting the filament or filaments, application of adhesive to the filament or filaments, and crosslinking the collected adhesive-treated filament or filaments.

The molten glass to be converted into the glass fiber product is produced in a melting furnace heated by combustion of a fuel with a rich oxidizer. In the present context, the term "rich oxidizer" is understood to mean a gas having an oxygen content of 80 vol % to 100 vol %. The combustion generates heat for the melting and flue gases. The flue gases generated are discharged from the melting furnace at a temperature between 1000° C. and 1600° C.

The combustion with a rich oxidizer heats the furnace with a high efficiency.

It should be noted that the heating of the furnace by combustion of a fuel with a rich oxidizer does not exclude the furnace from also being heated by additional means, such as, for example, electrodes.

According to the invention, a first energy optimization of the manufacturing process is carried out:

in that air is heated by heat exchange with discharged flue gases in a heat-exchange assembly with hot air being obtained, in that a reactant is preheated by heat exchange with the hot air in the heat-exchange assembly with the production of preheated reactant and of moderated air at a temperature between 200° C. and 500° C., and in that the preheated reactant is used as combustion reactant in the furnace.

The reactant is chosen from rich oxidizers and gaseous fuels. According to a preferred embodiment, a rich oxidizer is preheated before it is used in the melting furnace. It is also possible to preheat both a rich oxidizer and a gaseous fuel before they are used in the melting furnace. In this case, the preheating of the two reactants can be carried out in series or in parallel.

A second energy optimization of the manufacturing process is carried out in that the moderated air resulting from the heat-exchange assembly is employed during the conversion of the molten glass into a glass fiber product, so as to make use of the residual heat still present in this moderated air.

Moderated air resulting from the heat-exchange assembly is more particularly employed during the crosslinking of the adhesive-treated collected filament or filaments, this being done by bringing the collected adhesive-treated filament or filaments into contact with moderated air resulting from the heat-exchange assembly in order to promote the crosslinking.

According to the present invention, a significant energy synergy is thus produced between the melting and the conversion of the molten glass downstream of the melting in that moderated air resulting from the heat-exchange assembly is employed during the crosslinking of the collected adhesive-treated filaments.

Moderated air can also be employed in one or more other stages of the conversion of the molten glass, as described in the unpublished patent application FR 1 557 344.

The present invention thus also covers processes combining the use of moderated air resulting from the secondary exchanger in order to promote the crosslinking of collected adhesive-treated filaments, as described above, with one or more other uses of moderated air resulting from the heat-exchange assembly as described in this patent application.

Thus, moderated air can also be used during the application of adhesive to the filaments as spraying agent for an adhesive binder.

According to a preferred embodiment of the invention, moderated air can also be employed during the attenuation of the stream.

A distinction is made between:

a) mechanical attenuation by means of a winder or analogous winding member, b) attenuation by gas friction by means of one or more gas attenuation currents, and c) centrifugal attenuation by means of a centrifuge.

Centrifugal attenuation is in industrial practice generally combined with attenuation by gas friction.

According to a first embodiment of the attenuation by gas friction, also known as flame attenuation, the glass stream is cooled and solidifies, with a glass rod being obtained. The glass rod is introduced into a flame. The end of the rod is thus melted and subsequently attenuated by the combustion gases of the flame, so as to form one or more glass wool filaments. Flame attenuation makes it possible to produce very fine glass fibers but exhibits the disadvantage of consuming a great deal of energy, in particular because of the twofold melting of the glass. Flame attenuation is generally used for products of high added value.

According to a second process of attenuation by gas friction, which is slightly less energy-guzzling, also known as gas attenuation, the molten glass stream is directly, that is to say without passing through a solidified phase, impacted by one or more currents or jets of attenuation gas, such as a current of steam or of combustion gas.

According to a known process, combining centrifugal attenuation and attenuation by gas friction, the molten glass stream is introduced into a centrifuge and is converted by centrifugal force into a large number of molten glass filaments. Said filaments are subsequently attenuated by a cylindrical curtain of attenuation gas which surrounds the centrifuge. The latter process provides most of the production of glass fibers for insulation.

In order for the attenuation by gas friction to be effective, the viscosity of the glass during the attenuation has to be sufficiently low, which in its turn requires that the attenuation gas be very hot and makes it possible to bring the glass to and/or maintain it at a high temperature corresponding to a low viscosity.

When the process comprises a stage of attenuation by gas friction, moderated air is advantageously used for the production of one or more attenuation gas currents or for the production of one or more attenuation flames.

The conversion of molten glass into a glass fiber product optionally also comprises at least one of the following stages:

drying the filament or filaments, and texturing of the filament or filaments.

The texturing of the filaments makes it possible to increase the volume and sometimes the elasticity of the filaments.

The drying of the filaments can in particular be of use in order to fix the adhesive binder to the filaments by evaporation or volatilization of water or of another solvent present in the binder.

When the conversion comprises a stage of drying the filament or filaments, moderated air can be employed as drying agent in contact with the filament or filaments.

When the conversion comprises a texturing stage, moderated air can be used to generate a texturing gas current and more particularly a texturing air turbulent jet.

Moderated air resulting from the heat-exchange assembly can thus be used not only during the crosslinking stage but also in one or more other stages of the process.

In the present context, "heat exchange" between two fluids of different temperatures is understood to mean the transfer of heat or thermal energy from one of the two fluids (hotter fluid) toward the other of the two fluids (cooler fluid) through one or more walls without the two fluids coming into direct contact or mixing.

"Heat exchanger" or "exchanger" is understood to mean a plant or a device in which two fluids of different temperatures move in separate chambers or circuits without direct contact or mixing between the two fluids, in which plants or devices heat is transmitted from the hottest fluid to the coolest fluid through one or more walls separating the two chambers or circuits.

The term "filament" refers to an attenuated stream.

In order to improve the homogeneity of the glass stream and thus the homogeneity and the quality of the filament or filaments obtained by attenuation of the stream, the molten glass can be refined before the spinning.

The melting and the refining of the glass can then take place in one and the same melting/refining chamber of the furnace, the refining zone then being located downstream of the melting zone and upstream of the molten glass outlet in the direction of flow of the glass.

The melting and the refining can also take place in separate chambers of the furnace, the refining chamber being located downstream of the melting chamber. It is then considered that the furnace encompasses these two chambers.

According to one embodiment, the molten glass is extruded immediately at the outlet of the furnace, for example through a bushing located at the molten glass outlet of the furnace.

According to an alternative embodiment, the molten glass resulting from the furnace is transported by a pipeline from the furnace, that is to say from a molten glass outlet of the furnace, toward a bushing for the spinning of the molten glass into stream(s).

In the present context, the term "bushing" refers to any spinning device which makes it possible to produce one or more molten glass streams from a molten glass bath. The bushing can be provided in several embodiments, such as a pierced metal plate. The bushing can itself be heated, for example electrically, in order to prevent the extrusion/spinning perforation or perforations from being partially or completely blocked by (partially) solidified, indeed even crystallized, glass.

The heat-exchange assembly advantageously comprises a primary exchanger and a secondary exchanger. Air is then heated by heat exchange with flue gases discharged from the furnace in the primary exchanger and the reactant is preheated in the secondary exchanger by heat exchange with the hot air resulting from the primary exchanger.

According to one embodiment, the heat-exchange assembly comprises a primary exchanger and a secondary exchanger, air being heated by heat exchange with flue gases discharged from the furnace in the primary exchanger, with hot air at a temperature between 500° C. and 800° C. being obtained, and the combustion reactant being preheated in the secondary exchanger by heat exchange with hot air resulting from the primary exchanger.

It has turned out that, by virtue of the amount of residual thermal energy of the moderated air, the present invention makes possible a significant improvement in the energy efficiency of the processes for the manufacture of glass fiber products comprising a stage of application of adhesive to the filament or filaments, followed by a stage of crosslinking the adhesive-treated filament or filaments.

The crosslinking of the adhesive-treated filament or filaments generally takes place in a crosslinking chamber, also known as crosslinking oven.

The filament or filaments are preferably collected in the form of a fleece on a conveyor which brings the collected filament(s)/the fleece into the crosslinking chamber.

The filaments can be treated with adhesive before they are collected or after they are collected. It is thus possible, for example, to apply adhesive to the fleece of filament(s) on the conveyor.

The expressions "collected adhesive-treated filaments" and "adhesive-treated collected filaments" are synonymous and do not indicate the chronological order between the stages of application of adhesive and of collecting.

The conveyor is usefully gas permeable. In this case, moderated air resulting from the heat-exchange assembly is advantageously sucked through the fleece and the conveyor into the crosslinking chamber in order to promote the crosslinking of the filament or filaments.

The crosslinked fleece obtained is subsequently generally shaped and/or cut up and/or coated with a sheet (typically on one face only), and the like, so as to obtain a shaped glass-fiber-product, such as glass fiber panels or rolls.

Such shaped products are used as thermal insulation products, acoustic insulation products and/or fire protection products.

The crosslinked fleece can also be used more generally as nonwoven glass fiber fabrics.

The present invention also relates to a plant capable of being used in the implementation of the manufacturing process according to the invention.

The plant comprises a glass melting furnace and a conversion unit for the conversion of molten glass into a glass fiber product.

The furnace of the plant is intended to produce molten glass from solid materials. It comprises a molten glass outlet, an outlet for flue gases and at least one burner for the combustion of a fuel with a rich oxidizer, that is to say an oxidizer having an oxygen content of 80 vol % to 100 vol %.

The furnace generally comprises several burners.

As already indicated above, the furnace can also comprise other heating devices complementing the at least one above-mentioned burner.

The conversion unit of the plant comprises a device, known as bushing, for the spinning of molten glass resulting from the melting furnace into at least one stream, the bushing being more particularly connected fluidically to the molten glass outlet of the furnace.

The transformation unit also comprises an attenuation device for the attenuation of the at least one stream resulting from the bushing into one or more filaments, and also a collector for the collecting of the filament or filaments resulting from the attenuation device.

An adhesive applicator for the application of adhesive (binder) to the filament or filaments upstream of or after the collection and a crosslinking chamber for the crosslinking of the adhesive-treated collected filament or filaments also form part of the conversion unit.

The transformation unit also optionally comprises one or more of the following devices:
 a dryer for the drying of the filament or filaments, and
 a chamber for texturing the filament or filaments.

The attenuation device of the plant is advantageously appropriate for the implementation of any one of the attenuation processes mentioned above. Thus, the attenuation device can comprise:
 one or more mechanical attenuation devices, such as winders or analogous appliances, or
 one or more burners for flame attenuation, or
 one or more gas current generators for the gas attenuation,
it being known that said gas current generators can be burners generating combustion gas currents used as attenuation gas currents.

The attenuation device can also comprise a combination of a centrifuge for the centrifugal attenuation with one or more gas current generators for the gas attenuation of the streams resulting from the centrifuge, it being possible for said generators, as indicated above, to be burners.

When the attenuation device produces one or more continuous filaments, the collector can be a winder or another device for the winding of the filament or filaments. It is thus possible to use a winder both as mechanical attenuation device and collector.

The collector can also be a conveyor on which the filament or filaments are collected. Such a conveyor is particularly indicated when the stream or streams are attenuated to give a large number of filaments, in particular to give a large number of short filaments.

The plant according to the invention is designed so as to make possible a high energy efficiency of the melting furnace and also an energy synergy between the melting furnace and the conversion unit located downstream of the furnace.

To this end, the plant comprises a heat-exchange assembly for the heating of air by heat exchange with flue gases discharged from the furnace and for the preheating of a combustion reactant by heat exchange with the hot air thus obtained. Preheated combustion reactant and moderated air are thus obtained. The heat-exchange assembly is fluidically connected to a source of air, to the flue gas outlet of the furnace and to a source of combustion reactant, the latter source being a source of rich oxidizer or a source of gaseous fuel. The heat-exchange assembly exhibits a moderated air outlet and a preheated reactant outlet.

The preheated reactant outlet of the heat-exchange assembly is fluidically connected to one or more burners of the melting furnace in order to make possible the use of the preheated reactant as combustion reactant in the melting furnace.

According to the invention, the moderated air outlet of the heat-exchange assembly is fluidically connected to the crosslinking chamber in order to promote the crosslinking of the adhesive-treated filament or filaments by contact with moderated air resulting from the heat-exchange assembly.

Given the flow rate and the temperature of the moderated air at the secondary exchanger outlet, the use of this moderated air to promote the crosslinking of the adhesive-treated filaments has proved to be particularly effective and thus makes it possible to significantly improve the energy efficiency of the overall process.

In the present context, two elements are "fluidically connected" when they are connected by a pipe or a pipeline so as to make possible the flow of a fluid from one of the two elements toward the other of the two elements through this pipe or pipeline.

The source of air can, for example, be an air blower.

The heat-exchange assembly preferably makes possible at least the preheating of a rich oxidizer, indeed even the preheating of a rich oxidizer and of a gaseous fuel.

The source of rich oxidizer can, for example, be a unit for the separation of the gases of the air or a pipeline or tank for a liquefied rich oxidizer.

The heat-exchange assembly usefully comprises a first heat exchanger, referred to as "primary exchanger" or "primary heat exchanger", for heat exchange between the flue gases discharged from the furnace and the air to be heated, and also a second heat exchanger, referred to as "secondary heat exchanger" or "secondary exchanger", for heat exchange between the hot air resulting from the primary exchanger and the reactant to be preheated. In this case, the primary exchanger is fluidically connected to the source of air and to the flue gas outlet of the furnace. The secondary exchanger is fluidically connected to the source of reactant to be preheated. The secondary exchanger also exhibits the preheated combustion reactant outlet and the moderated air outlet.

According to an embodiment which makes possible the preheating of a rich oxidizer and of a gaseous fuel, the heat-exchange assembly comprises a first and a second secondary exchanger, the first secondary exchanger being fluidically connected to a source of rich oxidizer and the second secondary exchanger being fluidically connected to a source of a gaseous fuel.

The collector usefully comprises a conveyor for transporting the filament or filaments collected in the form of a glass fiber fleece toward the crosslinking chamber.

In this case, the adhesive applicator can be located upstream of the conveyor so as to make possible the application of adhesive to the filament or filaments before they are transported in the form of a fleece by the conveyor. The adhesive applicator can also be located at the conveyor, so as to make possible the application of adhesive to the filament or filaments present in the glass fiber fleece on the conveyor.

According to an advantageous embodiment, the conveyor is gas permeable. The oven then preferably comprises one or more suction devices for sucking moderated air resulting from the heat-exchange assembly through the glass fiber fleece and the conveyor inside the crosslinking chamber.

Typically, a shaping unit is provided downstream of the crosslinking chamber for the production of acoustic insulation and/or thermal insulation and/or fire protection products from the crosslinked fleece or of other products based on nonwoven glass fiber fabrics.

As already indicated above, the plant can comprise two secondary exchangers upstream of the burner: a secondary exchanger for the preheating of a rich oxidizer and a secondary exchanger for the preheating of a gaseous fuel, the burner receiving preheated rich oxidizer from the first of the two secondary exchangers and preheated gaseous fuel from the second of the two secondary exchangers. These two secondary exchangers can be positioned in series or in parallel with respect to the flow of the hot air resulting from the primary exchanger.

The furnace can be a melting/refining furnace as described above.

The bushing can be located at the molten glass outlet of the melting furnace. The plant can also comprise a pipeline for the transportation of molten glass from this molten glass outlet toward the bushing.

The invention also covers a plant as described above which also corresponds to a plant as defined in the unpublished patent application FR 1 557 344.

Thus, the moderated air outlet of the heat-exchange assembly can also be fluidically connected to one or more of the following devices of the conversion unit:

the attenuation device: for the production of an attenuation flame or of a gas attenuation current by means of moderated air resulting from the heat-exchange assembly;

the adhesive applicator: for the use of moderated air resulting from the heat-exchange assembly as agent for spraying the binder;

the dryer, if present: for the use of moderated air resulting from the heat-exchange assembly as drying agent in contact with the filament or filaments;

the texturing chamber, if present: for the use of moderated air resulting from the heat-exchange assembly as texturing gas current and more particularly as texturing air turbulent jet.

According to a preferred embodiment of such a plant, the attenuation device comprises an attenuation burner for producing an attenuation flame or for producing an attenuation gas current by the combustion of a fuel with moderated air resulting from the heat-exchange assembly, said attenuation burner then being fluidically connected with the moderated air outlet of the heat-exchange assembly.

According to a particularly preferred embodiment, the attenuation device comprises a centrifuge for the centrifugal attenuation of the stream or streams, and also an attenuation burner for the gas attenuation of the filaments resulting from the centrifuge. In this case, the attenuation burner is advantageously annular, capable of generating an attenuation gas current around the centrifuge and fluidically connected to the moderated air outlet of the heat-exchange assembly for the provision of moderated air as oxidant to the attenuation burner.

The plant according to the invention usefully comprises a hood surrounding the attenuation device. This hood can also surround the adhesive applicator and/or the dryer. When the plant is intended to produce a large number of short filaments, the hood makes it possible to prevent or to limit filaments from taking flight during the operation of the plant. The hood also more generally makes it possible to better control the attenuation conditions, indeed even the application of adhesive and/or drying conditions.

When the plant is intended to produce a large number of short filaments, the collector is preferably located below or at the bottom of the hood.

The plant according to the invention can be a plant for the production of nonwoven, textile or reinforcing fabrics, or also of acoustic insulation and/or thermal insulation and/or fire-protection products.

BRIEF DESCRIPTION OF THE FIGURES

FIG. 1 is a diagrammatic representation of a process and of a plant for the manufacture of a thermal insulation/acoustic insulation and/or fire-production fleece.

DETAILED DESCRIPTION OF THE INVENTION

The plant illustrated in FIG. 1 comprises a glass melting furnace 10 heated by a number of burners 12 (just one burner is shown in FIG. 1). To this end, rich oxidizer 28a, typically a gas containing between 95 vol % and 100 vol % of oxygen, and a gaseous fuel 29a, such as natural gas, are supplied to said burners 12.

The flue gases or combustion gases generated by the combustion of the fuel 29a with the rich oxidizer 28a are discharged from the melting furnace 10 and introduced into a primary exchanger 20 in order to heat the compressed air 24 supplied by the compressor 23. Downstream of the primary exchanger 20, the flue gases are discharged through the chimney 11, typically after having been subjected to a treatment for removal of pollutants. The hot air 25 resulting from the primary exchanger 20 is introduced into a first secondary exchanger 21 for the preheating of the rich oxidizer 28a and subsequently, in the form of partially moderated air 26, into a second secondary exchanger 22 for the preheating of the gaseous fuel 29a. The preheated rich oxidizer 28b resulting from the first secondary exchanger 21 and the preheated gaseous fuel 29b resulting from the second secondary exchanger 22 are supplied to the burners 12 as combustion reactants.

This makes possible a first very significant saving in energy in the manufacturing process according to the invention.

The molten glass resulting from the melting furnace 10 is introduced in the form of a stream of molten glass into a centrifuge 34 and the filaments resulting from the centrifuge 34 are attenuated by means of an annular current of attenuation gas generated by the crown-shaped attenuation burner 31.

The filaments resulting from this attenuation assembly are treated with adhesive by the sprayers 32 of the binder 35 and subsequently dried by jets of gaseous drying agent 36 injected by the dryers 33.

The stages of drawing, of application of adhesive and of drying are carried out in a controlled environment inside a hood 30.

The dried adhesive-treated filaments are collected in the form of a fleece 44 of filaments by a conveyor 42 at the bottom of the hood 30.

The conveyor 42 brings the fleece 44 toward a crosslinking oven 40 in which the adhesive-treated filaments are crosslinked under the effect of heat and thus binds the filaments together. Downstream of the oven 40, the rigid, semirigid or flexible fleece is shaped and wrapped up.

According to the invention, the residual heat present in the moderated air 27 resulting from the secondary exchangers 21, 22 is made use of in order to improve the energy efficiency of the conversion process downstream of the melting furnace 10.

Thus, a final portion of the moderated air 27 is introduced into the crosslinking oven and sucked through the fleece 44 inside the oven in order to promote the crosslinking of the filaments in the fleece 44.

Another portion of the moderated air 27 is used as drying gas 36 by the dryers 33, the residual heat of the moderated air 27 making it possible to accelerate the drying of the filaments.

In the embodiment illustrated, a final not insignificant portion of the moderated air 27 is introduced as oxidant into the attenuation burner 31 in order to more efficiently generate the attenuation gas current.

The advantages of the present invention will be better understood in the light of the following example.

The melting furnace produces 100 tpd of insulating fiber from 5 MW of thermal power. A contribution of electrical energy of the order of 1 to 5 MWe may be necessary according to the production conditions. The combustion flue gases exit at 1350° C. and can be cooled by dilution to reach a temperature of 1200° C. at the inlet of the primary exchanger. The 500 $Sm^3/h$ of natural gas (95% methane, 2% butane, 2% propane and 1% $CO_2$) are preheated to 450° C. The 1000 $Sm^3/h$ of oxygen are preheated to 550° C. In order to preheat these gases, close to 4000 $Sm^3/h$ of air are necessary. Heated to 650° C. in the primary exchanger, the air is cooled to 400° C. at the outlet of the secondary exchangers.

This air, which has an energy value of 530 kW, is subsequently conveyed, in a pipe preferably made of stainless steel, toward the crosslinking chamber. By virtue of this hot air, the amount of fuel is significantly reduced (10%). Additional fresh air can be supplied in the downstream part of the chamber for more exhaustive drying.

While the invention has been described in conjunction with specific embodiments thereof, it is evident that many alternatives, modifications, and variations will be apparent to those skilled in the art in light of the foregoing, description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaces by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A process for the manufacture of a glass fiber product in which molten glass is converted into a glass fiber product, comprising the steps of:
spinning the molten glass into at least one stream;
attenuating the at least one stream into one or more filaments;
collecting the filament or filaments;
application of adhesive to the filament or filaments before or after their collection;
crosslinking the adhesive-treated collected filament or filaments;
the molten glass is produced in a melting furnace heated by combustion of a fuel with a rich oxidizer having an oxygen content of 80 vol % to 100 vol %, with generation of heat and flue gases, said generated flue gases being discharged from the melting furnace at a temperature between 1000° C. and 1600° C.;
air is heated by heat exchange with discharged flue gases in a primary heat exchanger with hot air being obtained;
a reactant chosen from rich oxidizers and gaseous fuels is preheated by heat exchange with the hot air in a secondary heat exchanger with the production of preheated reactant and of moderated air at a temperature between 200° C. and 500° C.;

the preheated reactant is used as combustion reactant in the melting furnace; and moderated air resulting from the secondary heat exchanger is used during the crosslinking of the adhesive-treated collected filament or filaments by bringing the collected adhesive-treated filament or filaments into contact with moderated air resulting from the secondary exchanger in order to promote the crosslinking.

2. The process of claim 1, wherein the hot air is at a temperature between 500° C. and 800° C.

3. The process of claim 1, wherein the crosslinking takes place in a crosslinking chamber.

4. The process of claim 3, wherein the filament or filaments are collected in the form of a fleece on a conveyor which brings the collected filaments into the crosslinking chamber.

5. The process of claim 4, wherein the filaments are treated with adhesive before they are collected.

6. The process of claim 4, wherein the filaments are treated with adhesive after they are collected.

7. The process of claim 4, wherein the conveyor is gas permeable and moderated air resulting from the secondary exchanger is sucked through the fleece and the conveyor into the crosslinking chamber.

8. The process of claim 1, wherein the glass fiber product is a nonwoven fabric or an acoustic insulation and/or thermal insulation and/or fire-protection product.

* * * * *